(12) United States Patent
Shin et al.

(10) Patent No.: US 8,732,339 B2
(45) Date of Patent: May 20, 2014

(54) NPIV AT STORAGE DEVICES

(75) Inventors: George Shin, Boise, ID (US); Steven F. Chalmers, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 12/409,493

(22) Filed: Mar. 24, 2009

(65) Prior Publication Data

US 2010/0250785 A1 Sep. 30, 2010

(51) Int. Cl.
*G06F 3/00* (2006.01)
*G06F 12/00* (2006.01)

(52) U.S. Cl.
USPC .......................................... 710/3; 710/8; 711/6

(58) Field of Classification Search
None
See application file for complete search history.

(56) References Cited

U.S. PATENT DOCUMENTS

| | | | | |
|---|---|---|---|---|
| 7,543,081 B2 * | 6/2009 | Dugan et al. | ........................ | 710/3 |
| 7,602,774 B1 * | 10/2009 | Sundaresan et al. | .......... | 370/381 |
| 7,711,789 B1 * | 5/2010 | Jnagal et al. | ................... | 709/213 |
| 7,831,681 B1 * | 11/2010 | Salli | .............................. | 709/212 |
| 7,860,097 B1 * | 12/2010 | Lovett et al. | .................. | 370/392 |
| 7,877,524 B1 * | 1/2011 | Annem et al. | .................. | 710/26 |
| 7,936,770 B1 * | 5/2011 | Frattura et al. | ................. | 370/412 |
| 8,341,314 B2 * | 12/2012 | Muppirala et al. | ............. | 710/39 |
| 2002/0021701 A1 * | 2/2002 | Lavian et al. | .................. | 370/401 |
| 2003/0061379 A1 * | 3/2003 | Craddock et al. | ............. | 709/238 |
| 2003/0081624 A1 * | 5/2003 | Aggarwal et al. | .............. | 370/412 |
| 2003/0161303 A1 * | 8/2003 | Mehrvar et al. | ............... | 370/386 |
| 2003/0229721 A1 * | 12/2003 | Bonola et al. | ................. | 709/253 |
| 2004/0059828 A1 * | 3/2004 | Hooper et al. | ................ | 709/238 |
| 2005/0198224 A1 * | 9/2005 | Kobayashi et al. | ........... | 709/220 |
| 2005/0276263 A1 * | 12/2005 | Suetsugu et al. | .............. | 370/389 |
| 2006/0253619 A1 * | 11/2006 | Torudbakken et al. | ......... | 710/31 |
| 2008/0008202 A1 * | 1/2008 | Terrell et al. | .................. | 370/401 |
| 2008/0123559 A1 * | 5/2008 | Haviv et al. | ..................... | 370/255 |
| 2008/0281979 A1 * | 11/2008 | Keeler | .......................... | 709/233 |
| 2009/0116381 A1 * | 5/2009 | Kanda | .......................... | 370/229 |
| 2009/0157846 A1 * | 6/2009 | Shimozono et al. | .......... | 709/218 |
| 2009/0307330 A1 * | 12/2009 | Allen et al. | .................... | 709/216 |
| 2010/0100695 A1 * | 4/2010 | Sudo et al. | ..................... | 711/162 |
| 2010/0100878 A1 * | 4/2010 | Otani | .............................. | 718/1 |

* cited by examiner

*Primary Examiner* — Henry Tsai
*Assistant Examiner* — Michael Sun

(57) ABSTRACT

One embodiment is a storage device that has multiple physical ports receiving input/outputs (I/Os) from a host computer. Each of the ports presents plural virtual ports using N_Port ID Virtualization (NPIV) to prioritize the I/Os.

17 Claims, 5 Drawing Sheets

NPIV AT STORAGE DEVICES

BACKGROUND

Host computers send input/output (I/O) requests to storage arrays to perform reads, writes, and maintenance. The storage arrays typically process the requests in a fraction of a second. In some instances, numerous hosts direct large numbers of requests toward a single storage array. If the array is not able to immediately process the requests, then the requests are queued.

I/O requests at a storage device are processed according to predefined priorities. Historically, Small Computer System Interface (SCSI) storage devices had limited information for use in prioritizing I/Os. This information included standard Initiator-Target-LUN (ITL) nexus information defined by SCSI and task control information. Effectively, SCSI protocol forced all I/Os through a particular ITL nexus and processed the I/Os with the same priority. Thus, all I/Os were processed with a same priority and quality of service (QoS). ITL nexus information is insufficient to identify I/Os according to application relevant priority or other QoS information.

In some storage systems, incoming I/Os include a unique initiator ID. This initiator ID identifies the host or a port on the host, but does not identify the application. Since a single host can simultaneously execute numerous applications, several applications can send I/Os through a same host port and receive identical initiator IDs. Further, in virtual environments, applications can move between various ports. As such, the initiator ID alone will not provide sufficient information of the application that generated the I/O. Thus, assigning priorities to specific initiator IDs would not result in knowing which priorities are being assigned to which applications.

Figure 4:
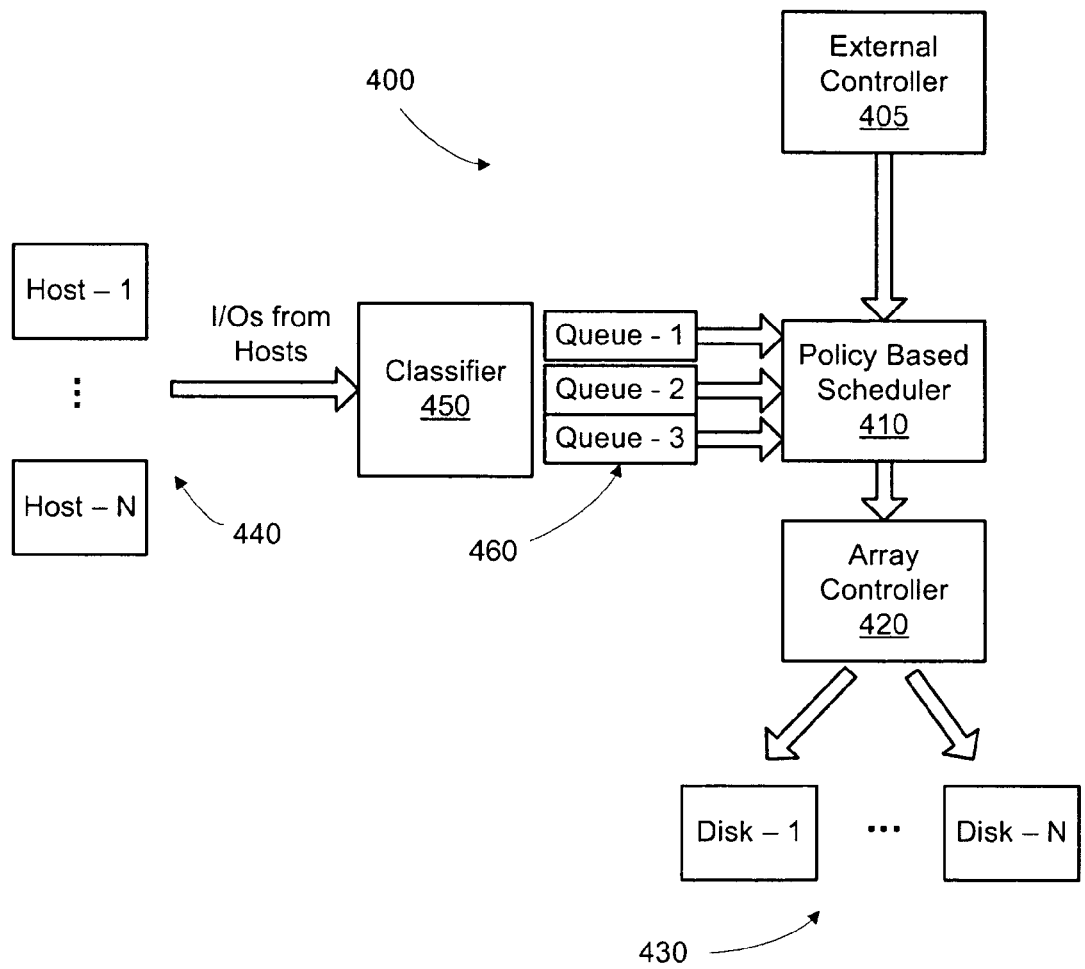

The FIG. 4 shows a storage system illustrating an array algorithm and control in accordance with an exemplary embodiment of the present invention.

Figure 5:
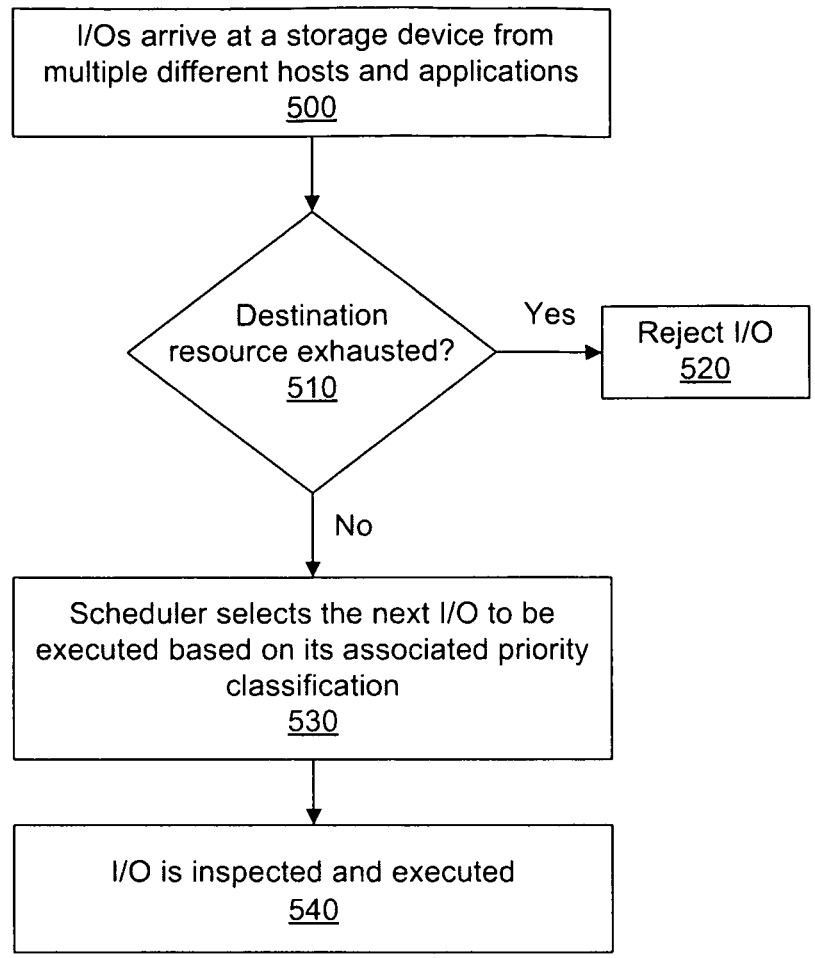

FIG. 5 shows a flow diagram of performing I/Os arriving at a storage device in accordance with an exemplary embodiment of the present invention.

DETAILED DESCRIPTION

Exemplary embodiments in accordance with the invention include apparatus, systems, and methods for prioritizing input/outputs (I/Os) to storage devices. N_Port ID Virtualization (NPIV) enables classification of input/outputs (I/Os) by storage devices.

In one exemplary embodiment, hosts or servers (initiators) initiate sessions and commands to storage devices (targets), such as disk arrays. NPIV is used on the storage devices to present multiple targets on the disk array to instruct incoming I/Os what priority to use to execute the I/O. Each port on the target includes multiple NPIV addresses. For example, each port has 8 to 16 NPIV addresses. Exemplary embodiments, however, are not limited to any specific number of NPIV addresses at a port on a storage device since a single port could have hundreds or thousands of NPIV addresses. In this manner, NPIV at the target is used for quality of service (QoS) since the target or storage device is able to classify and/or prioritize I/Os.

One exemplary embodiment establishes a prioritization of I/Os and uses quality of service (QoS) information to effectively manage global priority. Exemplary embodiments are applicable to non-virtual and virtual environments, such as a storage system that uses shared host bus adapters (HBAs) in virtual machine environments. In one embodiment, the NPIV application is placed at a storage pool where I/Os are converging.

Exemplary embodiments thus globally manage I/O priority using NPIV at the storage device. This global management independently occurs whether host side applications, operating systems (OSs), or hypervisors implement and use NPIV, QoS, GROUP NUMBER field in SCSI Command Descriptor Blocks (CDBs)/commands or PRIORITY field in FCP_CMND_IU payload. The storage device presents multiple NPIV targets, and performance class is a property of the target. SAN zoning is used to determine which servers or hosts are permitted to address which performance classes. Exemplary embodiments allow storage device servers to group host/server/replication I/Os that need similar or same priority used by one or a set of applications and/or virtual machines in a network environment, such as a consolidated data center. Fixed and/or variable priority or QoS information is tagged into each host/server side I/O and used by an I/O scheduler at the storage devices using the relationship between multiple addresses and priorities.

I_T nexus represents the logical relationship between an Initiator and a Target (I and T) used to communicate via the SCSI family of protocols. One exemplary embodiment uses multiple "virtual" target node ports at the storage device server to present to clients appearance of multiple I_T nexii (i.e., plural I_T nexus) than there are number of physical/real initiator and target ports. These virtual target node ports create multiple lanes of prioritization/QoS levels for client I/Os independent of client setup. The creation part that precedes the usage of "virtual" target node ports involves implementing NPIV at the storage device and presenting an NPIV switching fabric at the server side.

Exemplary embodiments are applicable when a storage device is the destination of I/O's in a consolidated IT data center with shared HBA's in a vertically integrated server machine, both legacy and new, with many virtual machines and applications running on top a hosting OS or Hypervisor (for example, VMware ESX, Hyper-V, and Citrix Xen). In data centers, the initiator and target port count can be far less than the origin of the consolidated application and system I/O's. For instance, applications far exceed the number of physical I_T nexii count where Logical Unit Number (LUN) based QoS is not feasible or possible. Here, the requirement can be for the storage device server to apply resource allocation and concurrency policies to these consolidated I/O's and/or target LUN(s). The exemplary embodiment allows target side prioritizations and QoS to be managed without updating any part of the client software stack and while supporting consolidation of legacy host software stacks. Further, the hardware at the server or host side does not need to be updated.

In one exemplary embodiment, host computers run different operating systems with multiple different applications simultaneously executing on each host computer. Thus, hosts make I/O requests (for example, read and write requests) to storage devices with varying expectations for command completion times. Although these I/O requests can include a SCSI priority, this priority does not take into account current workloads in the storage device with regard to other hosts and applications contemporaneously accessing the storage device. Embodiments in accordance with the present invention provide a more flexible system for managing priorities of I/O requests from multiple different servers and multiple different applications by taking into account or assessing current workloads in the storage device with regard to other hosts and applications contemporaneously accessing the storage device.

Exemplary embodiments include storage area networks (SANs) that use Fibre Channel and SCSI commands to transfer data between hosts and storage devices.

In SCSI command protocol, an initiator (example, a host-side endpoint of a SCSI communication) sends a command to a target (example, a storage-device-side endpoint of the SCSI communication). Generally, the initiator requests data transfers from the targets, such as disk-drives, tape-drives, optical media devices, etc. Commands are sent in a Command Descriptor Block (CDB). By way of example, a CDB consists of several bytes (example, 10, 12, 16, etc.) having one byte of operation code followed by command-specific parameters (such as LUN, allocation length, control, etc.). SCSI currently includes four basic command categories: N (non-data), W (write data from initiator to target), R (read data from target), and B (bidirectional). Each category has numerous specific commands.

In a SCSI system, each device on a SCSI bus is assigned a logical unit number (LUN). A LUN is an address for an individual device, such as a peripheral device (example, a data storage device, disk drive, etc.). For instance, each virtual disk drive in a disk array is provided with a unique LUN. The LUN is often used in conjunction with other addresses, such as the controller identification of the host bus adapter (HBA) and the target identification of the storage device.

SCSI devices include the HBA (i.e., device for connecting a computer to a SCSI bus) and the peripheral. The HBA provides a physical and logical connection between the SCSI bus and internal bus of the computer. SCSI devices are also provided with a unique device identification (ID). For instance, devices are interrogated for their World Wide Name (WWN).

Figure 1:
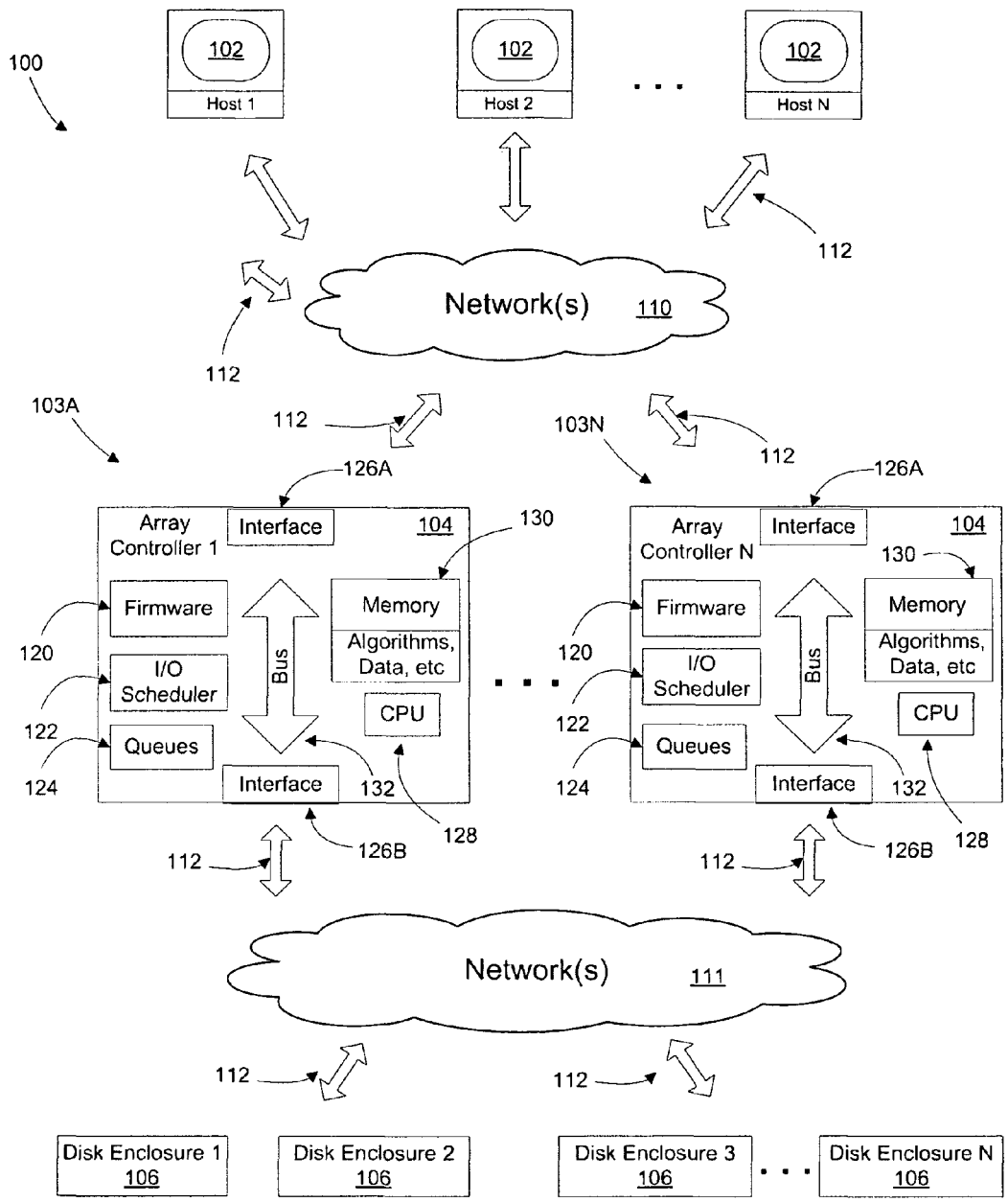
FIG. 1 shows a block diagram of a storage system in accordance with an exemplary embodiment of the present invention.

FIG. 1 shows a distributed or cluster storage system 100 in accordance with an exemplary embodiment of the present invention. By way of example, the system is a cluster storage network and/or a storage area network (SAN) that includes a plurality of client computers, nodes, or host computers 102 and one or more storage devices or arrays 103A, 103N that include one or more storage controllers 104 (shown by way of example as an array controller), and a plurality of disk enclosures or storage devices 106 (shown by way of example as disk enclosure 1 to disk enclosure N).

The host computers 102 (shown as host 1 to host N) are coupled to the array controllers 104 through one or more fabrics or networks 110, and the storage devices or arrays 103 are coupled to the storage devices 106 through one or more fabrics or networks 111. For instance, the hosts communicate with an array controller using Small Computer System Interface (SCSI) commands over a Fibre Channel (FC). By way of example, networks 110 and 111 include one or more of the Ethernet, FC, serial attached SCSI (SAS), iSCSI, internet, local area network (LAN), wide area network (WAN), public and/or private networks, etc. Communications links 112 are shown in the figure to represent communication paths or couplings between the hosts, controllers, and backend storage devices.

In one exemplary embodiment, the storage devices (such as array controller 104 and disk arrays 106) are network attached devices providing random access memory (RAM) and/or disk space (for storage and as virtual RAM) and/or some other form of storage or storage device, such as magnetic memory (example, tapes), micromechanical systems (MEMS), or optical disks, to name a few examples. Typically, storage devices include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the storage devices include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The storage array controller 104 includes numerous electronic devices, circuit boards, electronic components, etc. By way of example, the array controller 104 includes firmware 120, an input/output (I/O) scheduler 122, plural queues 124, one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102. For instance, processor 128 is coupled to a host interface 126A that provides bidirectional data communications to one or more host computers 102. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses, channels, wires, or other communication medium 132.

Embodiments in accordance with the present invention are not limited to any particular type or number of databases, storage device, storage system, and/or computer systems. The storage system, for example, includes one or more of various portable and non-portable computers and/or electronic devices, servers, main frame computers, distributed computing devices, laptops, and other electronic devices and systems whether such devices and systems are portable or non-portable. Further, some exemplary embodiments are discussed in connection with SCSI commands in the context of a storage system. Exemplary embodiments, however, are not limited to any particular type of protocol or storage system. Exemplary embodiments include other protocol (example, interfaces using I/O commands) in any computing environment.

Exemplary embodiments provide apparatus and methods for managing priority and QoS information to classes of host or client I/Os in a consolidated Information Technology (IT) data center with a mix of both new and legacy client configurations/setups. By centralizing the management of priority and QoS information at the storage target device server through use of standardized FC functionality profile (for example, NPIV), exemplary embodiments enable the location of I/O scheduling information and policies to be away from the client. At the same time, clients benefit from the QoS of their service requirements. Use of NPIV is further benefited by the fact that Fibre Channel over Ethernet (FCoE) supports NPIV.

Figure 2:
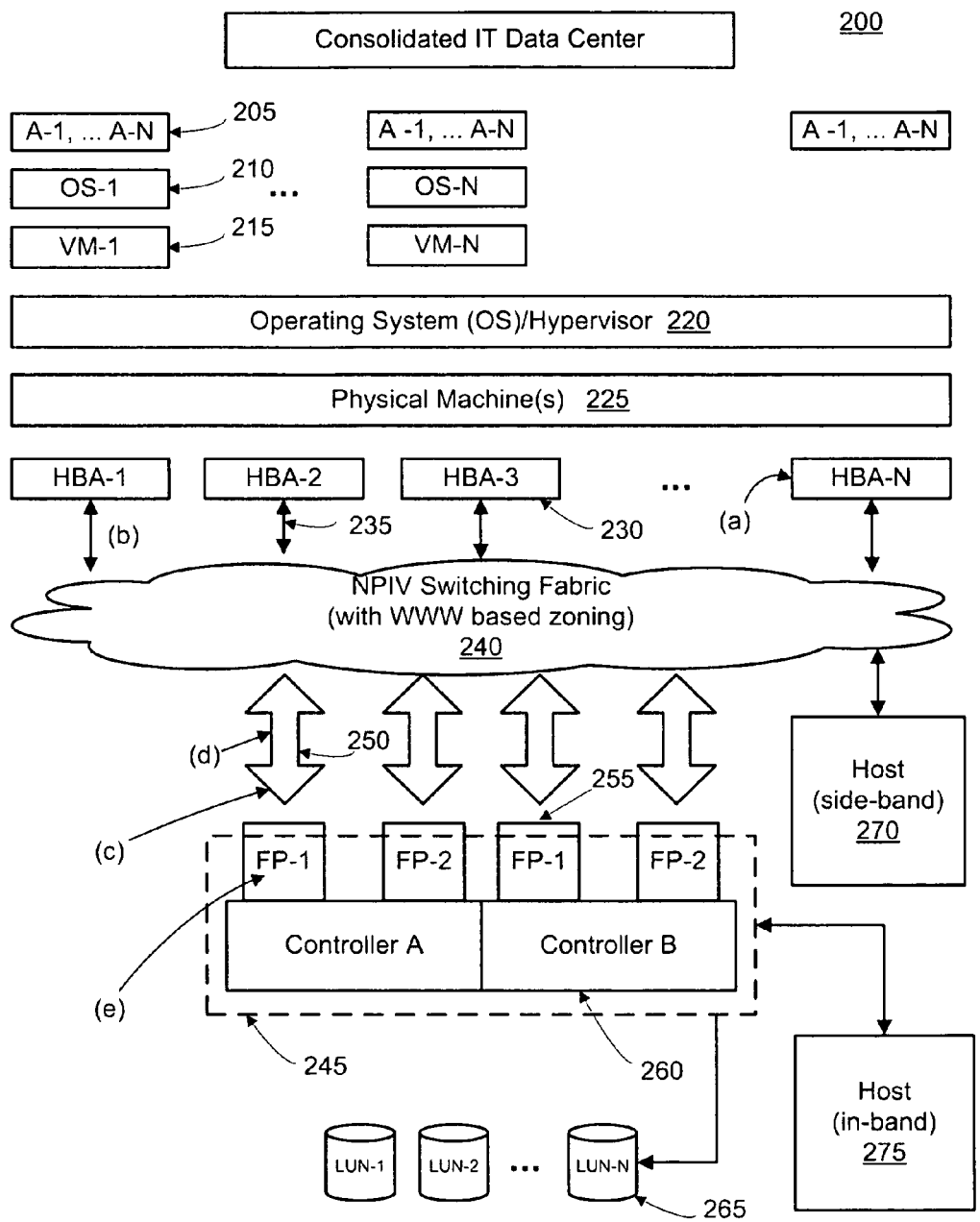
FIG. 2 shows a data center in accordance with an exemplary embodiment of the present invention.

FIG. 2 shows a block diagram of a consolidated IT data center 200. A top level includes a plurality of applications 205 (shown as application 1, A-1, to application N, A-N) that execute on operating systems 210 (shown as OS-1 to OS-N) and virtual machines 215 (shown as VM-1 to VM-N). Underneath the top level is a real OS or some sort of hypervisor 220 like functionality layer (for example, VMware ESX server). Physical machines 225 are located underneath the OS 220 and include many shared physical HBA's 230 (shown as HBA-1, HBA-2, HBA-3, to HBA-N).

In FIG. 2, the letter (a) represents that shared HBA's are legacy types, i.e. non-NPIV aware HBA firmware and drivers. Physical connections 235 exist between the HBAs 230 and a network 240, such as an NPIV switching fabric with WWW based zoning. This type of fabric performs zoning to the granularity of the virtual N_Port ID's. NPIV-aware switches support this type of zoning. Physical connections are created between a real N_Port and F_Port, as shown with the (b).

The network 240 connects to a storage device or an array module 245 through trunks 250 and front end fabric ports 255 (shown by way of example as FP-1 and FP-2). The array module 245 includes multiple controllers 260 (shown as controller A and controller B). Each controller has multiple front end fabric ports (for example, FP-1 and FP-2). The array module 245 couples to or communicates with multiple LUNs 265. Furthermore, a host or external controller 270 (sideband, over Fibre Channel) couples to the network 240, and a host or external controller 275 (in-band, over IP traffic) couples to the array module 245.

As shown, the array module 245 includes dual controllers A and B. Each controller contains two real frontend N_Port's, shown as FP1 and FP2 at (e). The (c) shows each FPx port (FPx being front-end fabric port X) having a physical point-to-point fabric attached (or fabric direct attached) topology with a remote F_Port in the NPIV switching fabric. Within each physical connection, the trunk 250 contains multiple/arbitrary logical/virtual connections (for example 128 total connections) that are created through means of NPIV for each virtual target port, shown in (d).

Figure 3:
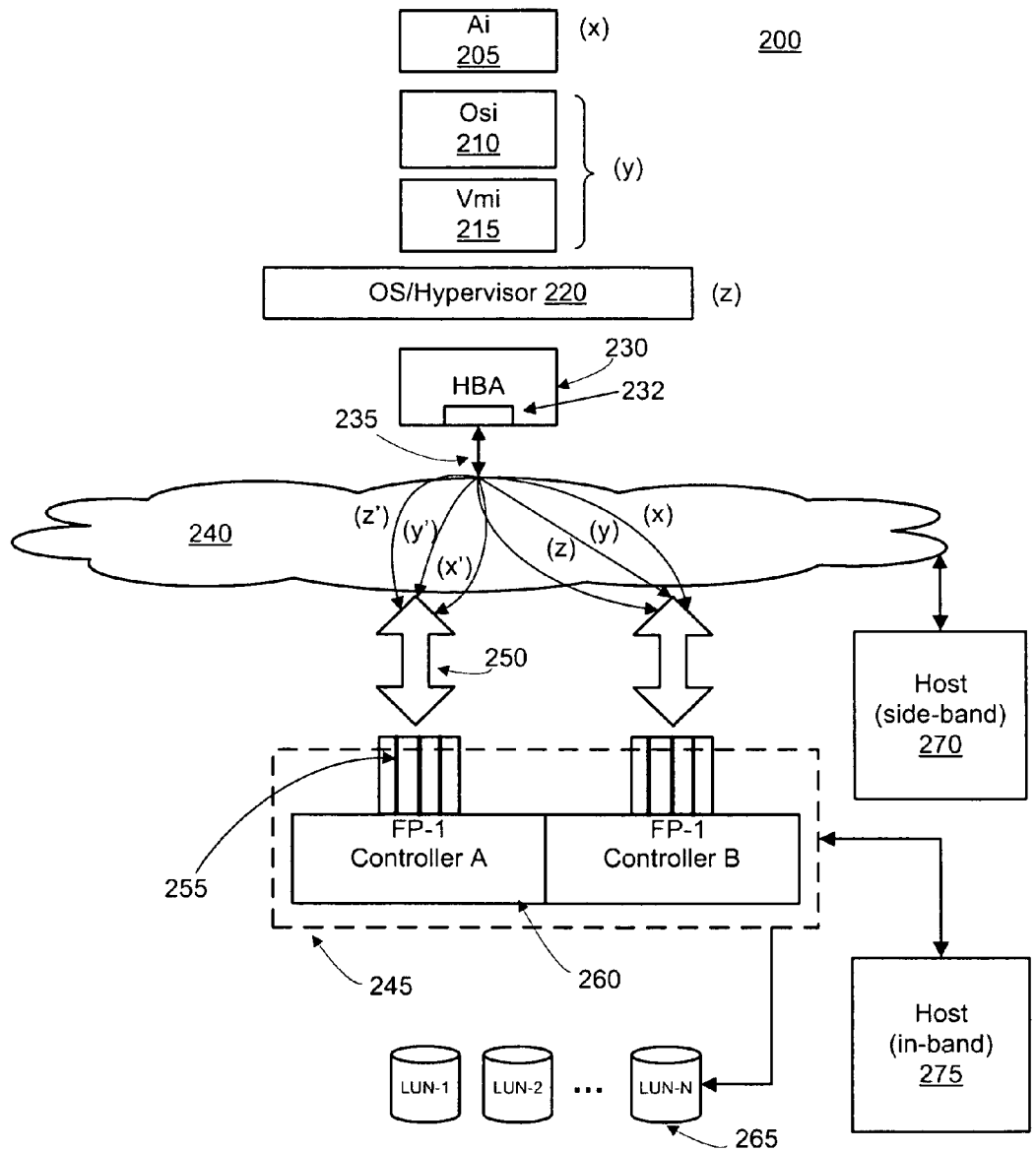
FIG. 3 shows a portion of the data center shown in FIG. 2 in accordance with an exemplary embodiment of the present invention.

FIG. 3 shows a portion of the data center shown 200 in FIG. 3. In FIG. 3, (x), (y), and (z) with their corresponding (x'), (y'), and (z') represents I/Os associated with source/origin workloads assigned specific virtual I_T nexii. Each (x), (y), and (z) identifies a unique or different I/O workload. Each workload requires a specific quality of service from the storage device (i.e. different QoS classes needed by these I/O clients). The shared HBA 230 is a legacy type and includes a single initiator port 232. This initiator port is connected to a remote F_Port in the Storage Area Network (SAN) as shown at 235. The physical connection 235 is able to communicate over virtual I_T nexii with target storage device servers' NPIV. The physical trunks 250 contain logical connections that connect to virtual ports 255.

Network 240 supports NPIV switching with WWN-based zoning. The storage administrator, using the WWN-based zoning, taps into the "virtual" target port WWPN's to create multiple logical paths. For example, six logical paths are created, such as (x), (y) and (z) to controller B, and (x'), (y') and (z') to the other controller A for multi-pathing and load balancing requirements. Effectively this method has created a total of six connections/paths (i.e., I_T nexii (or LU paths)) between a single initiator HBA port 232 and the storage device 245. When the initiator port aggregates all client I/O's, from (x), (y) and (z), the initiator port sends down to one of the I_T nexus, a particular lane that at its destination is a unique WWNN/WWPN and N_Port ID (i.e. FC Port Address) as supported by NPIV functionality profile in T11 standard. This results in multiple addresses, which provides more addresses with much fewer physical/real target ports count. Information about these "virtual" lanes is uploaded to the external controller, such as external controller 270/275 (for example, gWLM, Global Workload Manager). The storage administrator is given a total of six Logical Unit (LU) paths to use and establish the storage for (x), (y) and (z) clients. And some sort of pre-programmed application/VM/OS profiles/personalities can be used in properly weighing down the "virtual" connections with proper priority and QoS information.

With the embodiment shown in FIG. 3, a first transformation function is able to use multiple addresses to classify the I/O's from the clients into multiple real-time request queues. Each real-time request queue is assigned priorities. This priority information can be fixed and based on the logical I_T nexus. Alternatively, the storage administrator from an external controller assigns and downloads the "relative priority" (out of 128 total ports) and/or "workload group association" to the storage device.

A second transformation function involves setting up a "quantum" (for example, resource sharing percentage and I/O completion concurrency) for a policy based scheduler. For example, the scheduler uses deficit round robin fair queuing, and each queue is assigned its own quantum. The quantum value can be a fixed/static based value derived from the WWNN/WWPN and N_Port ID, or downloaded by the external client for each "logical" I_T nexus that storage device supports. The flexibility of WWN-based zoning is also used to resolve any overlapping uses of the virtual target ports.

The FIG. 4 shows a storage system 400 illustrating an array algorithm and control for an exemplary embodiment. An external controller 405 connects to a policy based scheduler 410 which, in turn, connects to an array controller 420 and multiples disks 430 (shown as disk-1 to disk-N). Although FIG. 4 shows controller 405 as being external, exemplary embodiments also include the controller being located inside the array module (i.e., an internal controller).

Hosts 440 (shown as host-1 to host-N) transmit I/O requests through a port to a classifier 450. The I/Os are classified according to one of plural different priorities and transmitted to one of plural separate queues 460 (shown as queue-1, queue-2, and queue-3) for each active QoS class. Alternatively, a single queue or a data structure other than queues can be used. For example, exemplary embodiments include implementations that create the effect of multiple queues by using linked lists, scoreboards, or any of a wide variety of other techniques. The array classifies I/Os based on priority, on the virtual port to which they are addressed, and subsequent processing in the array reflects those priorities in some way.

The policy based scheduler 410 then transmits the I/Os to the array controller 420, and the I/Os are executed in accordance with the priority of the QoS class. With system 400, the storage device takes the priority and QoS information and applies this information to the policy based scheduler, which uses the priority queues that are setup properly according to what the storage administrator intended.

FIG. 5 shows a flow diagram of performing I/Os arriving at a storage device. FIG. 5 presents a process that actually occurs as two distinct and parallel processes. First, the inbound I/Os are classified and deposited into priority queues or equivalent. Second, a scheduler removes I/Os from the priority queues and injects them into the backend of the array for execution.

According to block 500, I/Os arrive at a storage device from multiple different hosts and applications. The storage device has multiple physical ports and multiple NPIV logical ports for receiving the I/Os.

According to block 510, a question is asked whether the destination resource is exhausted. If the answer to this question is "yes" then the I/O is rejected according to block 520. If the answer to this question is "no" then the I/O are sent to one or more queues to await processing.

According to block 530, a scheduler selects the next I/O to be executed based on its associated priority classification.

According to block 540; the I/O is inspected and executed.

Definitions

As used herein and in the claims, the following words are defined as follows:

The term "Fibre Channel" is a high-speed network technology used in storage networking. Fiber optic cables (or twisted pair copper wire) transmit signals (such as SCSI commands) using Fibre Channel Protocol (FCP) in a storage network.

The term "Fibre Channel Protocol" or "FCP" is a protocol that transmits SCSI commands over Fibre Channel networks.

The term "HBA" or "host bus adapter" is a hardware device that connects a host computer to a network and/or storage device.

The term "hypervisor" is computer hardware virtualization software that enables plural operating systems (OSs) to execute simultaneously on a host computer.

The term "initiator" means an endpoint that initiates a session and/or command. Typically, a computer is an initiator and a data storage device is a target. For example, the initiator is a server and the target is a disk array.

The term "NPIV" or "N_Port ID Virtualization" allows multiple N_Port IDs to share a single physical N_Port. In a SAN, plural initiators can occupy a single physical port on a storage device.

The term "quality of service" or "QoS" is the ability to provide different priorities to different applications, users, or data flows (such as I/Os). For example, QoS enables a target device (such as storage device) to prioritize I/O requests from an initiator device (such as a host computer).

The term "SCSI" standards for small computer system interface that defines a standard interface and command set for transferring data between devices coupled to internal and external computer busses. SCSI connects a wide range of devices including, but not limited to, tape storage devices, printers, scanners, hard disks, drives, and other computer hardware and can be used on servers, workstations, and other computing devices.

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

The term "target" means an endpoint that receives a command from an initiator. Typically, a computer is an initiator and a data storage device is a target. For example, the initiator is a server and the target is a disk array.

The terms "World Wide Name" or "WWN" is a unique identifier in Fibre Channel or Serial Attached SCSI storage network. A WWN includes an eight byte number (for the first three bytes) and an identification supplied by the vendor.

The term "World Wide Port Name" or "WWPN" is the World Wide Name assigned to a port in a Fibre Channel fabric.

The term "World Wide Node Name" or "WWNN" is a World Wide name assigned to a node (such as a target device) in a Fibre Channel fabric.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A storage device, comprising:
multiple physical ports that receive input/outputs (I/Os) from a host computer, each of the multiple physical ports presents plural virtual ports using N_Port ID Virtualization (NPIV) at the storage device such that each of the multiple physical ports includes multiple NPIV addresses, wherein the I/Os are prioritized using the NPIV at the storage device, independent of the host computer using NPIV, based on a current workload of the storage device, and wherein a first transformation function classifies the I/Os into multiple real-time request queues using the multiple addresses, and a second transformation function assigns a quantum for a policy based scheduler to each queue.

2. The storage device of claim 1, wherein the storage device is a disk array, and the NPIV is used to present multiple different targets on the disk array and provide target-side prioritization to execute the I/Os.

3. The storage device of claim 1, wherein the NPIV provides for quality of service (QoS) at the storage device.

4. The storage device of claim 1, wherein each of the physical ports is divided into plural logical ports, and each of the plural logical ports are assigned a different priority for incoming I/Os.

5. The storage device of claim 1, wherein the storage device uses multiple virtual target node ports to present clients with an appearance of plural initiator-target (I_T) nexus with multiple lanes of prioritization for the I/Os.

6. The storage device of claim 1, wherein the NPIV supports World Wide Name (WWN)-based zoning.

7. A method, comprising:
receiving input/outputs (I/Os) from hosts at one physical port on a storage device;
using N_Port ID Virtualization (NPIV) at the storage device to present the one physical port as having multiple virtual target node ports with multiple NPIV addresses;
prioritizing the I/Os using the NPIV at the storage device, independently of whether the hosts use NPIV, based on a current workload of the storage device, with a first transformation function classifying the I/Os into multiple real-time request queues using the multiple addresses, and a second transformation function assigning a quantum for a policy based scheduler to each queue; and
executing the I/Os with a target-side priority assigned by the storage device.

8. The method of claim 7 further comprising, grouping, by the storage device, hosts together that require a same priority.

9. The method of claim 7 further comprising, scheduling, by the storage device, the I/Os to execute with the target-side priority assigned by the storage device and according to a quality of service (QoS) indicated by the storage device.

10. The method of claim 7 further comprising, globally managing I/O priority using NPIV at the storage device independently of whether host side applications, operating systems, and hypervisors use NPIV.

11. The method of claim 7 further comprising, using World Wide Name (WWN)-based zoning to create multiple logical paths for the multiple virtual target node ports.

12. A storage system, comprising:
a storage device including multiple physical ports to receive input/outputs (I/Os) from a host computer, each of the multiple physical ports presents plural virtual ports using N_Port ID Virtualization (NPIV) at the storage device such that each of the multiple physical ports includes multiple NPIV addresses;
a classifier to classify the I/Os into multiple real-time request queues using the multiple addresses; and
a policy based scheduler to assign a quantum value to each queue,
wherein the I/Os are prioritized using the NPIV at the storage device, independent of the host computer using NPIV, based on a current workload of the storage device.

13. The storage system of claim 12 wherein the I/Os are prioritized using the NPIV at the storage device based on the current workload of the storage device and a quality of service (QoS) indicated by the storage device.

14. The storage system of claim 13 wherein the I/Os are classified according to one of plural different priorities and transmitted to one of plural separate queues for each active QoS class.

15. The storage system of claim 14 wherein the storage device applies the priority and QoS information to the policy based scheduler.

16. The storage system of claim 12 wherein I/Os having a same priority are grouped together.

17. The storage system of claim 12 wherein World Wide Name (WWN)-based zoning is used to create multiple logical paths for the plural virtual ports, and the quantum value is derived from a World Wide Node Name (WWNN) or World Wide Port Name (WWPN).

* * * * *